United States Patent [19]
Thompson

[11] 3,796,859
[45] Mar. 12, 1974

[54] MAGNETIC INK RECORDING SYSTEM TO BOTH MAGNETIZE AND READ INK

[75] Inventor: David A. Thompson, Somers, N.Y.

[73] Assignee: International Business Machines Corporation, Armonk, N.Y.

[22] Filed: Dec. 27, 1971

[21] Appl. No.: 212,579

[52] U.S. Cl. .................. 235/61.11 D, 179/100.2 CH
[51] Int. Cl. .......................... G11b 5/30, G06k 7/08
[58] Field of Search ......... 179/100.2 CH, 100.2 CF, 179/100.2 C; 340/174.1 F, 149 A; 346/74 MC; 235/61.11 D

[56] References Cited

UNITED STATES PATENTS

| | | | |
|---|---|---|---|
| 3,493,694 | 2/1970 | Hunt | 179/100.2 CH |
| 3,624,313 | 11/1971 | Dekoster | 179/100.2 CH |
| 2,712,601 | 7/1955 | Reinwald | 179/100.2 CH |
| R26,610 | 6/1969 | Dekoster | 179/100.2 CH |

*Primary Examiner*—Bernard Konick
*Assistant Examiner*—Alfred H. Eddleman
*Attorney, Agent, or Firm*—George Baron

[57] ABSTRACT

A magnetoresistive recording head is employed to both magnetize magnetic ink on a document as well as to read the magnetized ink prior to its loss of magnetism. A strong magnet produces the desired bias field along the easy axis of the ink to magnetically polarize the ink, but such strong field is applied perpendicular to the magnetoresistive sensing element, which strong field serves only to bias that sensing element, not switch it.

3 Claims, 4 Drawing Figures

MAGNETIC INK RECORDING SYSTEM TO BOTH MAGNETIZE AND READ INK

BACKGROUND OF THE INVENTION

Many documents, such as checks, credit cards, consumer transactions, etc. contain data in the form of magnetic ink. In the processing of such data, a station applies a magnetizing field to the data to permanently magnetize the latter. At a second station, a conventional recording head senses the edges of the inked characters.

In such prior art schemes, the station at which the magnetized ink is magnetized is distant from the reading head, so that the latter reads the remanent flux in the ink rather than the initial total magnetization in the ink. Normally, such remanent field or flux in the ink is quite small, but a detectable voltage signal output can be obtained from the read head if the documents pass rapidly by the reading head. Since the output signal voltage is an inductive voltage, the signal strength is proportional to the velocity of the document past the head.

However, in certain types of systems that process specified data arising, for example, from consumer transactions, the data might need be manually fed to the recording head after the ink has been magnetized. Such manual feeding presents the ink at a low velocity to the reading head so that the output signal of a velocity dependent recording head is small, often too small to be of practical utility. In order to overcome this shortcoming in inductive reading heads when slow speed data are processed, a head is used whose sensing element is a magnetoresistive strip that is magnetically biased transverse to the easy axis of the strip. Such bias is selected to be near the most sensitive region of the resistance versus magnetic field curve of the strip so as to cause a relatively large change in resistance for a small change in applied field. A representative magneto-resistive recording head is that shown and described in the Hunt U.S. Pat. No. 3,494,694 which issued Feb. 3, 1970 on an application field Jan. 19, 1966.

The present invention exploits the advantages of a magnetoresistive sensing element, such as that shown in the Hunt patent, for processing magnetized data with the added advantages of (1) not requiring a separate magnetizing station for the magnetic ink on the document and (2) obtaining a large output signal from the reading head employing a magnetoresistive strip. These two advantages are achieved simultaneously by employing a magnet, permanent or electromagnetic, in conjunction with the magnetoresistive sensing element of a recording head so that the magnet applies the desired low bias field, i.e., of the order of 10 oersteds, transverse to and in the plane of the magnetoresistive sensing element near the most sensitive region of the R-H curve of that element, but perpendicular to the plane of the ink on the passing document where it is ineffectual to impart any substantial flux to the ink. However, the magnet applies a high magnetizing field (of the order of a few hundred oersteds) in the plane of the ink so as to magnetically saturate the ink, but such high field is perpendicular to the plane of the magnetoresistive element where it is ineffectual to affect its sensitivity. Thus, if the magnetoresistive strip is located within a yoke that is a strong permanent magnet, one leg of said yoke will magnetize the data-bearing magnetic ink on the document and such magnetic flux from the ink will pass, substantially undiminished, beneath the magnetoresistive sensing head, to be sensed by the latter.

Consequently, it is an object of this invention to provide a compact system for reading data-bearing magnetic documents.

It is yet another object to achieve a unitary device that both magnetizes documents and reads them at substantially the same station.

A further object is to provide a reading head that serves simultaneously to apply saturating flux to data-bearing magnetic documents as well as to favorably bias itself so as to achieve increased efficiency in the processing of such documents.

The foregoing and other objects, features and advantages of the invention will be apparent from the following more particular description of a preferred embodiment of the invention as illustrated in the accompanying drawings.

DESCRIPTION OF THE PREFERRED EMBODIMENTS

Figure 1:
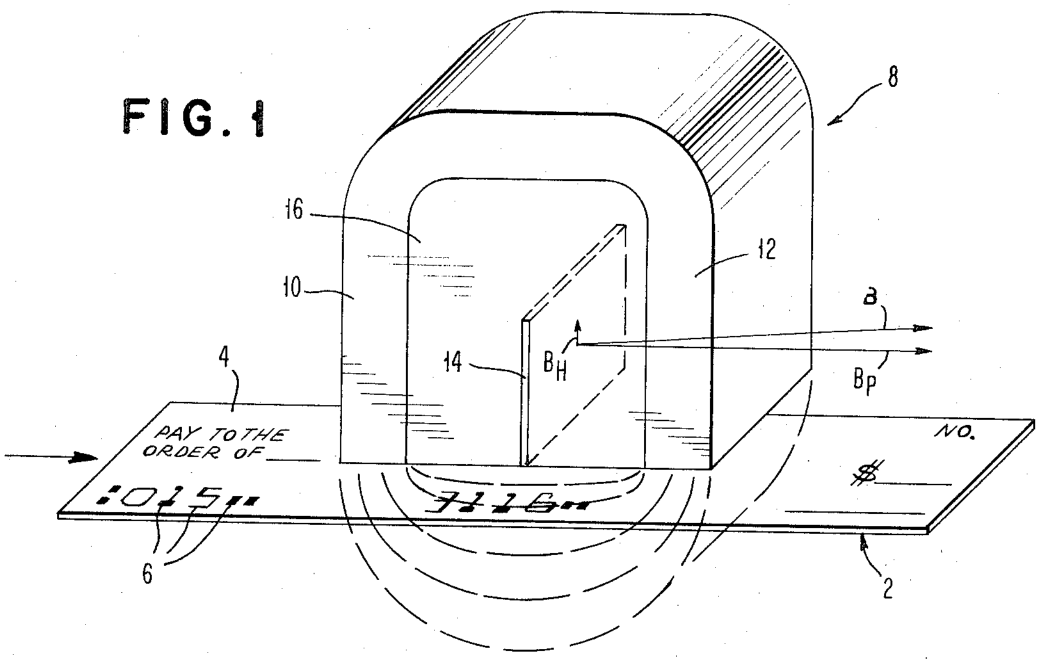
FIG. 1 is a schematic showing of a preferred embodiment of the invention.

FIG. 1 shows a document 2 that is made to move in the direction of the arrow either manually or by electromechanical or mechanical means, not shown. On the top surface 4 of the document 2, magnetic characters 6, as ink, are impressed, printed, sprayed, or otherwise affixed to the document and such characters, although normally alphanumeric, may be of any kind which, when recognized, are meaningful and significant to the processor of such data in the document 2.

The reading station of the document 2 comprises a yoke permanent magnet 8, having legs 10 and 12, in the center of which is a thin magnetoresistive strip 14, said strip 14 being held in its position between legs 10 and 12 by any electrically and magnetically inert material 16, such as, but not limited to, plastic, wood, or the like. Such strip 14 preferably has its lowermost edge flush with the bottom of legs 10 and 12. The field B generated by the permanent magnet 8 is so oriented with respect to strip 14 that the vertical component $B_H$ of that field B lies in the plane of strip 14, transverse to its easy axis of magnetization and its horizontal component $B_P$ is perpendicular to the plane of magnetoresistive strip 14. This same field B is applied to magnetically inked data, such as characters 6, as it approaches leg 10.

The two components $B_H$ and $B_P$ of field B are applied to the characters 6 so that the bias field $B_H$ is perpendicular to the plane of the ink forming the characters and is ineffectual to magnetize them. However, component $B_P$ is in the plane of the ink and applies a large magnetizing field to the latter. The ratio of $B_P/B_H \geqslant$ 30. Thus $B_H$ is about 10 oersteds and $B_P$ of the order of 300 or more oersteds. Moreover, magnetic component $B_P$ is employed to magnetize the inked characters 6 so as to impart a high saturation flux to the ink, so that when the latter passes under magnetoresistive element 14 a large signal can be sensed by it. This large component $B_p$ is ineffective as applied to strip 14 because it is perpendicular to the plane of that strip, and such perpendicularly applied field is 1/1000 as effective towards changing the sensitivity of magnetoresistive strip 14 as is the $B_H$ component. In a like manner, the $B_H$ component, while effective to bias the magnetoresistive strip 14, is ineffective in applying a magnetizing field to inked data 6.

Figure 2:
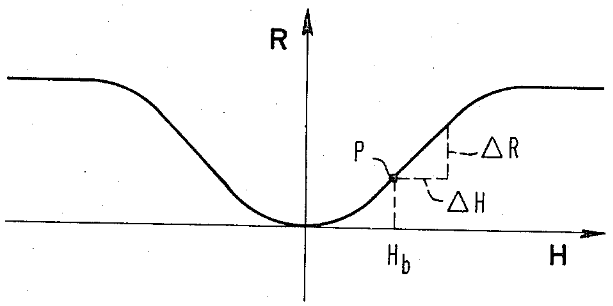
FIG. 2 is a plot of resistance versus magnetization of a magnetoresistive element employed in the reading head of the invention.
Figure 4:
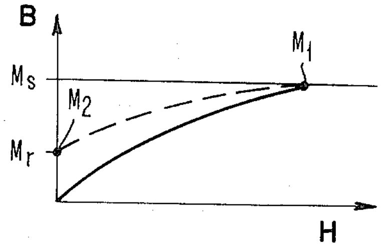
FIG. 4 is a plot of magnetic saturation versus applied field to the magnetic ink used in this invention.

FIGS. 2 and 4 are relied upon to illustrate the manner in which the invention operates. Because of the presence of the permanent magnet 8, magnetic component $B_H$ biases the R-H curve (See FIG. 2) at point P so that the strip 14 is biased at its most sensitive region, that is, a small change in H produces a relatively large change in R.

FIG. 4 is a plot of remanence magnetization $M_r$ versus saturation magnetization $M_s$. The solid line of the curve in FIG. 4 illustrates how the induced flux B varies with the applied magnetizing flux H. When the applied field H is removed, the remanent flux $M_r$ traverses the dotted line from $M_1$ to $M_2$ where $M_2$ is the remanent flux $M_r$ of the ink. Since the signal flux from the ink is roughly determined by the ratio of $M_s/M_r$, the latter ratio is quite high when the data 6 is magnetized just prior to being sensed by magneto-resistive element 14. In many prior art devices where the magnetizing is done at one station and the reading at another station, the remanent flux $M_r$ in the inked character 6 is about one-half or one-third of the saturating flux $M_s$. In the practice of the invention, $M_r$ is substantially that of $M_s$.

Figure 3:
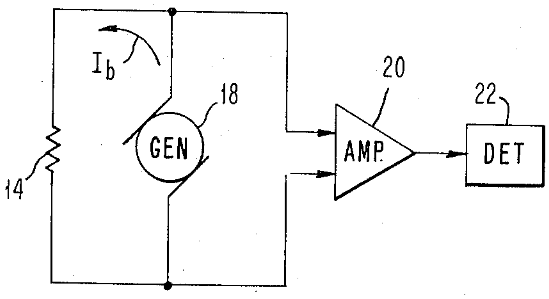
FIG. 3 is a showing of the invention and its associated circuitry.

In the sensing of the flux emanating from the inked character 6, magnetoresistive element 14 is biased by generator 18 (See FIG. 3) so that a biasing current $I_b$ constantly passes through element 14. When now magnetized information-bearing ink 6 passes under element 14, a change in resistance $\Delta R$ occurs in element 14, producing a voltage equal to $I_b(\Delta R)$, which voltage signal is amplified by sense amplifier 20 prior to being sent to an appropriate detector 22.

This invention, by providing the same magnet to both bias a magnetoresistive sensing element of a reading head and to magnetize information-bearing inked characters on a document, produces a compact unit for encoding bank checks, credit cards, consumer transactions, etc., simplifies the equipment needed for such encoding by removing the need for a magnetizing station remote from the reading station, and also increases the signal strength available to the reading head so as to provide greater resolution of the inked characters.

What is claimed is:

1. A recording head for reading magnetic ink on a document in which the ink is magnetized by the same structure that reads the document comprising:

a magnet for magnetizing said magnetic ink on the document, a magnetoresistive recording element located within the field of said magnet and in flux-coupling proximity to said document, said magnet being oriented with respect to said magnetoresistive recording element and said document so that substantially the full strength of its magnetic field is imparted to said ink in said document passing under said recording element, but only a small fraction of said magnetic field being effective to supply a magnetic bias in the plane of said magnetoresistive element, wherein said magnetoresistive element is located adjacent said magnet so as to sense said magnetic ink on said document soon after it has been magnetized.

2. The recording head of claim 1 wherein said magnetoresistive element lies in a plane perpendicular to the plane of the inked document.

3. The recording system of claim 1 wherein means for sensing the change in resistance in said magnetoresistive element as a function of said magnetized ink passing there-under is connected to said magnetoresistive strip.

* * * * *